United States Patent [19]
Holloway

[11] Patent Number: 5,079,225
[45] Date of Patent: Jan. 7, 1992

[54] PROCESS AND APPARATUS FOR PREPARING TEXTURED CRYSTALLINE MATERIALS USING ANISOTROPY IN THE PARAMAGNETIC SUSCEPTIBILITY

[76] Inventor: Aleksey Holloway, 522 N. 32nd St., Omaha, Nebr. 68131

[21] Appl. No.: 492,746

[22] Filed: Mar. 12, 1990

[51] Int. Cl.⁵ .............................................. H01B 12/00
[52] U.S. Cl. ................................... 505/1; 156/603; 156/DIG. 73; 505/729; 505/742; 505/727
[58] Field of Search ............... 505/1, 729, 742, 727; 156/663, DIG. 73

[56] References Cited

U.S. PATENT DOCUMENTS

| | | | |
|---|---|---|---|
| 4,939,121 | 7/1990 | Rybka | 505/727 |
| 4,939,308 | 7/1990 | Maxfield et al. | 505/729 |
| 4,942,151 | 7/1990 | Capone et al. | 264/24 |

FOREIGN PATENT DOCUMENTS

| | | | |
|---|---|---|---|
| 1-48322 | 2/1989 | Japan | 505/729 |
| 1-52332 | 2/1989 | Japan | 505/727 |
| 1-79099 | 3/1989 | Japan | 505/727 |
| 1-20714 | 5/1989 | Japan | 505/727 |

OTHER PUBLICATIONS

Noel et al., "Anisotropy of the Superconducting Magnetic Field $H_2$ of a Single Crystal of TmBaCuO", Solid State Communications, vol. 63, No. 10, pp. 915-917, 1987.

Arendt et al., "Aligned Sintered Compacts of RBaCuO$_7$ (R=Dy,Er,Eu,Gd,Ho,Y)", Material Res. Soc. Symp. Proc., vol. 99, 1988, pp. 203-208.

Ekin, "Transport Critical Current in Bulk Sintered YBaCuO and Possibilities for Its Enhancement", Adv. Cer. Mat., vol. 1, No. 3B, 1987, pp. 586-592.

Krusin Elbaum et al., "Field Dependence of Meissner Effect in a Single Crystal of YBa,CuO . . . ", Mat. Res. Soc. Symp. Proc., vol. 99, 1988, pp. 221-226.

Lasnikov et al., "Mechanical and High Temperature (920° C.) Magnetic Field Grain Alignment of Polycrystalline (Hc,Y)Ba$_2$Ca$_3$O$_{7-\delta}$", J. Appl. Phys. 65(8), 15 Apr. 1989, pp. 3136-3141.

Primary Examiner—Robert Kunemund
Attorney, Agent, or Firm—Sean Patrick Suiter

[57] ABSTRACT

The present invention discloses a process and apparatus for forming textures in materials. The process comprises heating a material having an anisotropy in the paramagnetic or diamagnetic susceptibility within a magnetic field. The material is heated to a temperature approaching its melting point while a magnetic field of at least $10^4$ Oe is simultaneously applied. The process and apparatus produce highly textured bulk and elongated materials with high current densities below critical superconducting temperatures.

33 Claims, 4 Drawing Sheets

PROCESS AND APPARATUS FOR PREPARING TEXTURED CRYSTALLINE MATERIALS USING ANISOTROPY IN THE PARAMAGNETIC SUSCEPTIBILITY

This invention was made with Government support under Contract No. W-7405-ENG-82 awarded by the Department of Energy. The Government has certain rights in this invention.

BACKGROUND OF THE INVENTION

The present invention is directed to a process for forming highly textured bulk objects (including single-crystals), and extended objects (such as wires and tapes) by applying a strong magnetic field ($H \geq 10^4$ Oe) and high (near melting point) temperatures to materials having anisotropy in the paramagnetic or diamagnetic susceptibility ($\chi$).

Standard conductors obey Ohm's law. As charges move through a conductor they produce an electric field that creates an electric current. The current density (J) of a conductor having a cross-sectional area A is defined as follows:

$$J = I/A$$

where I is the current running through the conductor. If a constant potential difference is maintained across a conductor the current (I) remains constant. If the current density in a conductor is proportional to the electric field within the conductor, the conductor is said to obey Ohm's law:

$$J = \sigma E$$

where $\sigma$ is the constant of proportionality and E is the electric field strength.

The resistance of a conductor may be calculated according to the following expression:

$$R = V/I$$

where V is the potential difference, and the resistivity of a material is found according to the following expression:

$$\rho = 1/\sigma.$$

In the early part of this century it was discovered that resistance dropped to zero in some materials, such as mercury (Hg), at low temperatures. Materials having an electrical resistance of zero (R=0) are called superconductors. Such materials do not obey Ohm's law.

Theories such as the BCS Theory of Superconductivity and the Cooper Electron Pairing Theory attempt to explain the lack of resistance in superconducting materials at $T_c$ (temperature at which resistance equals zero). While the BCS theory has not been entirely successful with new high $T_c$ ceramics the Cooper Electron Pairing Theory is commonly considered valid.

Recent developments in superconductor technology such as Paul Chu's synthesis of a material superconducting at 98K ($YBa_2Cu_3O_x$, where $x \approx 7$) and then the recent discovery of a superconducting ceramic material ($TlBa_2Ca_{n-1}Cu_nO_{2n+3}$) with a $T_c$ of $\approx 125K$ have lead to promising directions.

Now that economical $T_c$'s have been achieved new problems must be confronted and solved. One of these problems is critical current density ($J_c$).

For technological applications the critical current density (maximum current above which a material ceases to be superconducting) should have a magnitude of about $10^5$ to $10^6$ A/cm$^2$ at 77K. In single-crystals RE—$Ba_2Cu_3O_x$ (where RE is a rare earth) a critical current ($J_c$) of $\approx 3 \times 10^6$ A/cm$^2$ has been obtained. See, S. Jin, et al. 51 *Applied Physics Letters* 203 et seq. (1987).

However, $J_c$ is strongly anisotropic and is sufficient only for certain directions (for current flows in the Cu-O basal plane). In polycrystalline un-textured bulk and elongated samples, where grains are randomly oriented, superconducting current flows along "good" directions in some grains and along "bad" directions in other grains which results in an unacceptably low $J_c$ ($10^2$ to $10^3$ A/cm$^2$). Grain boundaries also have an adverse effect on $J_c$.

One logical approach to enhancing J is to prepare grain-oriented polycrystalline ceramics, or to turn or regrow grains in such a way that current flows along "good" directions only. Though the grain boundary problem or mismatch in a(b) axes registry may persist, it is possible to attain reasonably high $J_c$'s in textured compacts.

Textured material is a material in which the vast majority of the grains within the material have the same crystallographic orientation with respect to some reference direction. The highest probability texture direction is called the "preferred orientation."

A texture is specified with respect to the external directions of the material under consideration, for example, to the plane and edges of a tetragonally shaped bulk sample, or to the axis of a wire.

Textured materials very often have superior mechanical, electromagnetic, wave alternating and transducing properties, etc., and the demand for such material is increasing. For example, in the area of high temperature superconducting ceramics (HTSC) large single-crystal and high grain-oriented materials are desirable because they exhibit high critical current densities as well as high critical magnetic fields favored in single crystals and textured samples.

One method of producing texture is to influence the grain growth process. As grain growth occurs in a material, some grains grow at the expense of their neighbors. If a means can be found to enhance the growth of grains selected on the basis of their crystallographic orientation, highly textured material in which the vast majority of the grains are crystallographically oriented may be obtained.

A common method of producing such a selection mechanism is to utilize a temperature gradient during grain growth for materials with a large anisotropy in crystal growth directions. Another approach is to utilize mechanical pressure. For example, rolling thin sheets of certain metals causes preferential grain alignment.

In the present invention, the method of selecting a favored crystallographic orientation during grain growth includes providing a difference in the magnetic component of energy between grains favorably and unfavorably oriented with respect to the direction of an applied magnetic field. This difference in energy is due to two factors: (1) anisotropy in the paramagnetic/diamagnetic susceptibility (the difference in the grain magnetic susceptibilities in the directions parallel and perpendicular to the magnetic field); and (2) magnitude of the magnetic field itself (the energy term when the atomic magnetic moments are not saturated is proportional to the square of the magnetic field).

This implies that in order to maximize the magnetic energy term it is necessary to use the maximum achievable magnetic field. Magnetic fields of $10^4$ to $10^5$ Oe are currently producible with commercially available equipment.

When a material with an anisotropic magnetic susceptibility is placed in a magnetic field the energy of grains favorably oriented with respect to the field direction is lower than that of other orientations.

When a material is heated to a near melting point temperature and grain growth occurs, the larger size grains, due to a surface energy term, expand at the expense of the smaller grains. This process does not generally result in a preferred orientation. However, if a material is placed in a sufficiently strong magnetic field, so that the magnetic term dominates the surface energy term, the grains with favorable crystallographic orientation will grow at the expense of adjacent unfavorably oriented grains without regard to their size. This process results in textured samples.

SUMMARY OF THE INVENTION

Accordingly, it is a primary object of the present invention to produce a high degree of texture in polycrystalline materials.

Another object of the present invention is provide a process and apparatus for forming textured bulk samples and elongated samples (such as wires, tapes, and films) from any material possessing an anisotropy in the paramagnetic or diamagnetic susceptibility and more particularly from HTSC ceramics.

Another object of the present invention is to produce single-crystals from textured samples.

Another object of the present invention is to produce textured HTSC bulk and elongated ceramics with considerably higher values of superconducting critical current density ($J_c$).

Another object of the present invention is to provide a process and apparatus for producing materials exhibiting an anisotropy in thermal conductivity.

Another object of the present invention is to provide a process and apparatus for producing materials exhibiting a mechanical anisotropy.

Another object of the present invention is to provide a process and apparatus for producing materials exhibiting an optical anisotropy.

Another object of the present invention is to provide a process and apparatus for producing materials exhibiting an anisotropy in electrical conductivity.

Another object of the present invention is to provide a process and apparatus for economically producing materials having a high degree of texture.

Another object of the present invention is to provide a process and apparatus for producing specialized materials having one or more magnetic, thermal, electrical, or optical anisotropies.

In accordance with the present invention a process is provided for forming textures. The process comprises heating a material in a magnetic field.

The process also comprises heating the initial sample at a temperature approaching the material's melting point so as to initiate the grain growth process (the material should be heated at this temperature until substantial grain growth occurs (more than insubstantial grain growth)). The temperature may also be cycled above the material's melting point for short periods in order to speed up diffusion and avoid phase separation of the material. A magnetic field of at least $10^4$ Oe is simultaneously applied in order to modify the grain growth process so that highly textured material is produced.

DESCRIPTION OF THE PREFERRED EMBODIMENTS

The process and apparatus of the present invention are based upon the practical exploitation of the relationship between the crystal structure and the anisotropy in the paramagnetic or diamagnetic susceptibility of certain materials.

Specifically, this relationship is utilized by heating the material to a temperature approximating the material's melting point (the temperature at which intensive grain growth occurs) while simultaneously applying a very strong (at least $10^4$ Oe) magnetic field to direct grain growth. The resulting material is highly textured with the crystallographic orientation of grains corresponding to the maximum paramagnetic or diamagnetic susceptibility lying parallel to the applied field. Additionally, where sufficient space is available grains with the most favorable orientation tend to grow to very large sizes, and once extracted from the matrix these crystals are as large as single crystals produced by other techniques.

The following description discusses the nature of paramagnetic anisotropy, heat and magnetic field treatments, and some of the patented features of the present invention which patentably distinguish it from the prior art.

If a crystal or grain has an anisotropic paramagnetic or diamagnetic susceptibility ($\chi$) in its normal state, and is placed in a magnetic field H, the energy is minimal when the axis of maximum $\chi$ is parallel to the field. This tends to rotate the grain to an angle minimizing its energy in the field. Various sources of magnetic anisotropy for different materials may be present. The following discussion relates to high $T_c$ compounds, however, the principles hereinafter discussed are valid for all materials having an anisotropic magnetic susceptibility.

Figure 1:
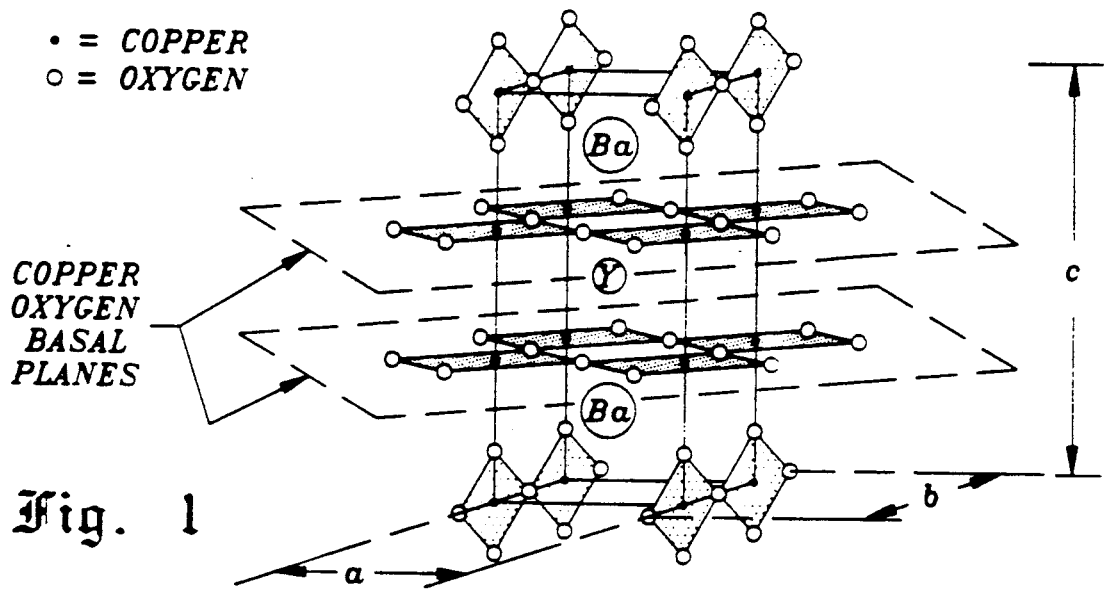
FIG. 1 is a diagrammatic illustration of the structure of $YBa_2Cu_3O_x$, where $x \approx 7$.
Figure 2:
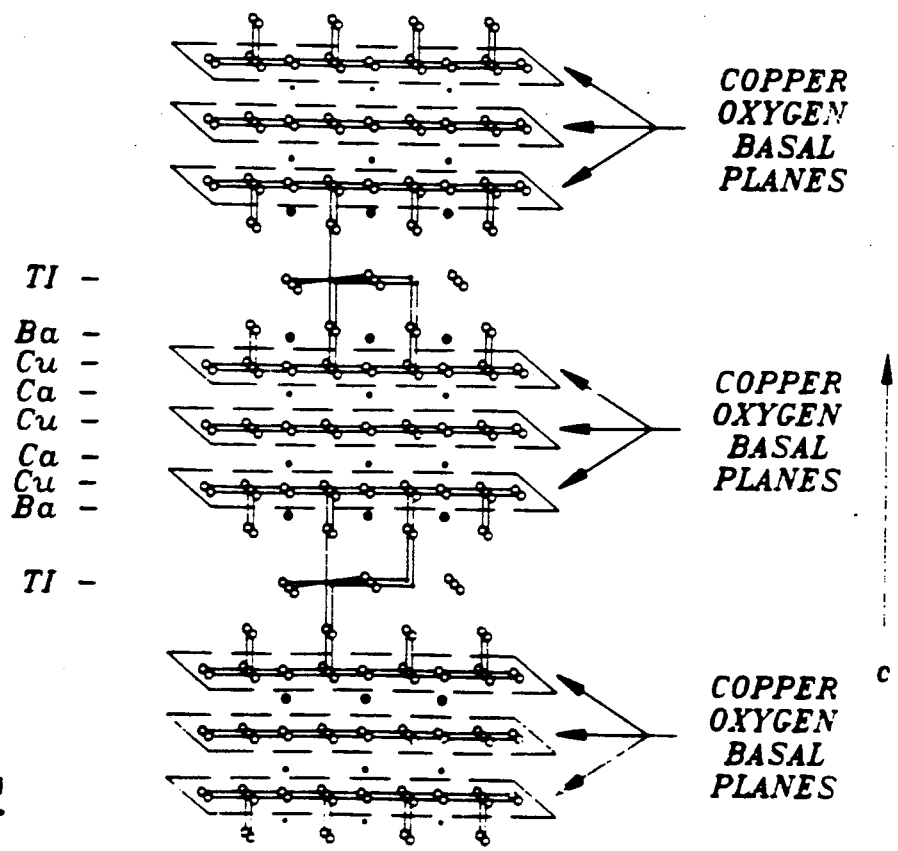
FIG. 2 is a diagrammatic illustration of the structure of $TlBa_2Ca_{n-1}Cu_nO_{2n+3}$ (where $n=3$)

The general feature of new high $T_c$ compounds is that the susceptibility parallel to the c direction $\chi_\|$, (the c direction is perpendicular to the Cu-O basal plane) is different from susceptibility perpendicular to the c direction $\chi_\perp$ (see FIGS. 1 and 2). In $YBa_2Cu_3O_x$ the anisotropy $\Delta\chi \equiv \chi_\| - \chi_\perp$ above $T_c$ ($\simeq 1 \times 10^{-4}$ cm$^3$/mol is positive and is probably due to anisotropy in the Van Vleck paramagnetic susceptibility of the Cu-O layers. FIG. 1 illustrates the structure of the unit cell of $YBa_2Cu_3O_x$ and also depicts the Cu-O basal planes and the perpendicular to it c direction.

In contrast when yttrium (Y) is replaced by a magnetic rare earth (RE) element, the main source of anisotropy is the single ion anisotropy of the RE ion. For example, the anisotropy for RE=Ho is somewhat larger (while having the same sign) than where RE=Y. In contrast, for RE=Eu the anisotropy (with an opposite sign) has a value $\Delta\chi = -6 \times 10^{-4}$ cm$^3$/mol.

The energy of rotation ($E_r$) in a magnetic field is proportional to $(\chi_\| - \chi_\perp)H^2$ and at room temperature the torque in a 9.4 T field was sufficient to align $YBa_2Cu_3O_x$ grains embedded in epoxy resin. This effect was demonstrated by D. E. Farrell, et al. 36 *Phys. Rev. B.* 4025 (1987) who reported grain alignment of $YBa_2Cu_3O_x$, powder with an x-ray rocking curve width of less than 2° full width at half maximum peak intensity. However, the material obtained by this method, due to the fact that superconducting grains are surrounded by non-superconducting epoxy, has little or no technological use.

FIG. 2 illustrates the structure of the unit cell of another superconducting ceramic material (discovered at the University of Arkansas) having a $T_c$ of $\simeq 125K$ ($TlBa_2Ca_{n-1}Cu_nO_{2n+3}$, where n=3), and the Cu-O basal planes contained within the structure.

Consequently, a process capable of aligning superconducting grains within bulk superconducting samples is desirable. The present invention utilizes a strong magnetic field during the grain growth process of polycrystalline materials having an anisotropy in a magnetic susceptibility to produce highly textured samples. The magnetic field provides a difference in the magnetic energy between grains oriented favorably and unfavorably with respect to the direction of the applied magnetic field. Since $\Delta\chi$ of the proportion $E_r = (\Delta\chi)H^2$ is a physical property of a given material at a given temperature, it is necessary to increase the magnetic field strength in order to obtain a sufficient energy of rotation $E_r$ to achieve a high degree of texture.

Because $\Delta\chi$ generally decreases with an increase in temperature it is desirable to increase the magnetic field strength. Additionally, the rate of grain growth increases dramatically as the melting point of a chosen material is approached.

When a material is heated to a near melting point temperature and grain growth occurs in the absence of a sufficiently strong magnetic field ($\leq 10^4$ Oe), the larger size grains, due to a surface energy term, expand at the expense of the smaller grains. This process does not generally result in a preferred orientation. However, if a material is placed in a sufficiently strong magnetic field ($\geq 10^4$ Oe), so that the magnetic term dominates the surface energy term, the grains with favorably oriented crystallographic orientation will grow at the expense of adjacent unfavorably oriented grains without regard to their size. This process results in highly textured samples. While some texture may be obtained with weaker magnetic field strengths ($\leq 10^4$ Oe) if a material is subjected to a weak field (while at near melting point temperatures) for extended periods. However, such an approach is uneconomical and ineffective to produce the high degree of texture required in modern applications.

It is known in the prior art that some degree of crystallographic texture has been produced in ferromagnetic materials by applying a magnetic field at a temperature below the Curie point. See, for example, *Magnetism and Metallurgy*, Vol. 2, C .D. Graham, Jr., "Textured Magnetic Materials," pp. 744-745, Academic Press, New York (1969).

The literature reporting texture within ferromagnetic materials demonstrates that the present invention is not an extension of the prior art in that: (1) the degree of alignment (texture) achieved on such materials is small and of limited value; (2) the magnitude of the magnetic field used, because it only "triggers" the spontaneous alignment of internal magnetic moments, is low and of the order of $10^2$ to $10^3$ Oe; and (3) the magnetic field is applied at temperatures below the Curie point of a given ferromagnetic substance (which is not necessarily close to the melting point of the substance).

It is also known, in the prior art, that the cooling of certain para- and diamagnetic substances, in a gradient of a magnetic field, may be used to produce a non-textured crystalline sample with nonuniform thickness. See, for example, G. E. Smerkovich-Galevy, 22 *Zhurnal Bseoyuznogo Khimicheskogo Obshchestva Imeni DI Mendeleeva* 102-104 (1977). However, this article does not teach the preparation of textured materials.

Finally, N. E. Reitz, U.S. Pat. No. 4,222,814, describes a process for producing a crystalline film from a paramagnetic sodium thallium type intermetallic compound. Reitz utilizes a magnetic field to assist in producing a dual diamond sodium thallium type intermetallic layered film having a crystallographic plane generally aligned parallel to the applied magnetic field.

However, Reitz does not teach: (1) how to prepare textured bulk and elongated objects; (2) the high magnetic field strength required to produce sufficient textures (those capable of industrial application) in materials having an anisotropy in the para- and diamagnetic susceptibility due to rotational magnetic energy term $E_r$; and (3) how to prepare large crystals.

The application of a magnetic field during heat processing to assist in single crystal growth is mentioned in a number of United States and foreign patents. See, for example, Morioka, et al., U.S. Pat. No. 4,609,530; Takasu, et al., U.S. Pat. No. 4,849,188; Suzuki, et al., United Kingdom Patent No. 2,109,267; Namshi, et al., Japanese Patent No. 58-217,493; Metsushita Elec. Ind. KK, Japanese Patent No. 59-21,593; Nishio, et al., Japanese Patent No. 62-162,690; Yamato, et al., Japanese Patent No. 64-24,090; and T. Suzuki, et al., IBM Disclosure No. EF-09, pp. 90-100.

However, the aforementioned documents do not teach the application of a magnetic field to produce materials exhibiting crystallographic alignment. The magnetic field is utilized to suppress the convection in the raw material melt and associated temperature fluctuations at the solid-liquid interface for Si, GaAs, InP, InSb crystals for LEC or Czochralski methods (see, for example, Morioka, et al., U.S. Pat. 4,609,530).

The application of a magnetic field generates a higher effective viscosity or magnetic viscosity in the fluid which in turn reduces the concentration of impurities or dislocations, or improves the uniformity of impurities or dislocations throughout a resulting single-crystal.

Additionally, the magnitudes of the applied magnetic field, in the before mentioned publications, vary in strength from a few hundred to a few thousand gauss (such field strengths are marginally insufficient to produce texture in the described materials).

A method of preparing highly textured ceramic materials has been shown by A. Lusnikov, et al., "Mechanical and high-temperature (920° C.) magnetic field grain alignment of polycrystalline $(Ho,Y)Ba_2Cu_3O_{7-\delta}$," *J. Appl. Phys.* 65(8), 15 Apr. 1989, p. 3136. the disclosure of which is hereby incorporated by reference.

FIGS. 1 and 2 illustrate the believed crystal lattice structure of $YBa_2Cu_3O_{7-\delta}$ and $TlBa_2Ca_{n-1}Cu_nO_{2n+3}$ (where n=3). FIGS. 1 and 2 also depict the Cu-O basal plane, and the a,b, and c axes of the crystal lattice structure of both $YBa_2Cu_3O_{7-\delta}$ and $TlBa_2Ca_{n-1}Cu_nO_{2n+3}$.

Figure 3:
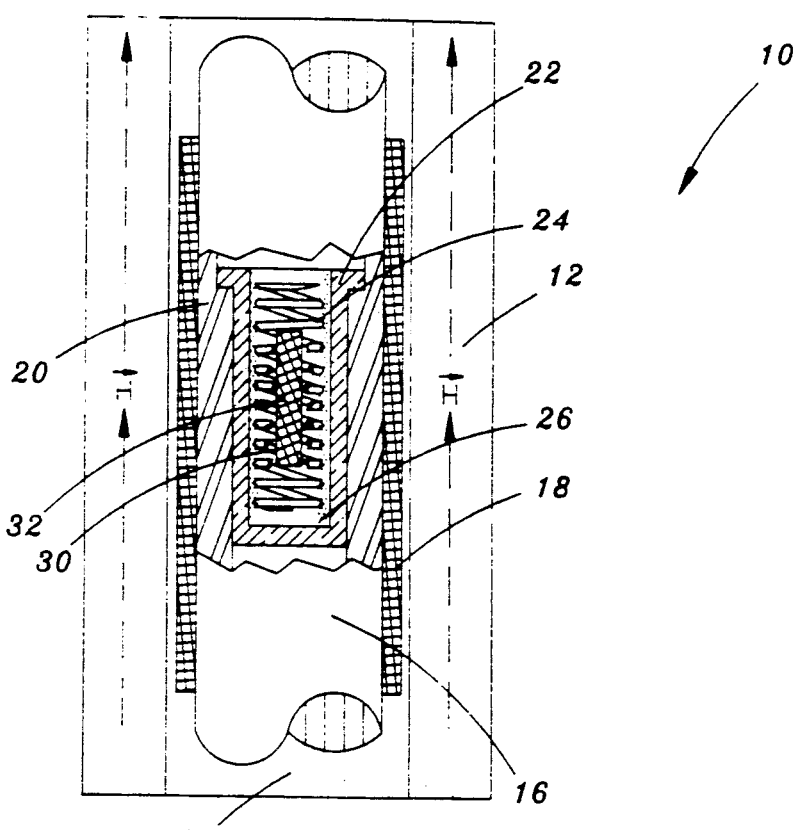
FIG. 3 is a side partial cross-section view of an apparatus for the production of textured bulk materials in accordance with the present invention.

Turning now to FIG. 3, an apparatus 10 is illustrated for producing highly textured bulk products having anisotropy in the paramagnetic susceptibility. In a preferred embodiment signal-producing transducers and the like may be formed from compounds such as $TlBa_2Ca_{n-1}Cu_nO_{2n+3}$ ($T_c \approx 125K$).

Powdered polycrystalline samples may be uniaxially cold pressed and placed into a crucible 30 having the shape required for a particular application. The crucible 30 may then be placed into an oven 34.

The oven 34 may be constructed from a stainless steel tube 16 situated inside the bore 14 of a superconducting magnet 12 capable of generating magnetic field intensities up to $10^5$ Oe. Although in both FIG. 3 and 4 the vector of the magnetic field H is shown on the magnet 12 because of the space limitations, the field is along the axis of the tube 16. Magnets of this type are available from Cryomagnetics, Inc., P.O. Box 548, Oakridge, Tenn. 37839. In order to protect the inside bore 14 of the magnet 12 from the heat of the oven 34 the steel tube 16 is preferably wrapped with a high temperature insulation 18.

A length of nichrome wire 24 may be bent at the center and wound into a cylindrical shape and placed within the inside diameter of an alumina crucible 22 (like those available from Coors). The wire 24 is then adhered, by a high temperature adhesive 26, to the inside diameter of the alumina crucible 22 (the lengths of the wire must not make contact with each other). An additional benefit of forming the wire 24 in this manner is that a direct current applied to the wire 24 induces only a small total magnetic field which assists in retaining samples while the oven 34 is held within the strong magnetic fields generated by the apparatus 10.

Temperatures exceeding 1100° K. may be achieved by applying a direct current from a power source to the nichrome wire 24. The temperature inside the oven 34 may be monitored by a thermocoupling device and controlled by varying the potential of the power source.

The magnet may be protected by the high temperatures generated by the oven 34 with a thermal insulating material 18 (such as Inswool-HP available from AP Green Company, Mexico, Mo. 65265) may be placed between the oven 34 and the magnet 12. As an alternative, water or air cooling may be used.

The crucible 30 containing the cold pressed polycrystalline material is then placed in the oven 34 so that the poles of the magnet are perpendicular to the desired crystal orientation of the bulk sample.

The sample is then kept for approximately ten hours at a temperature 100° K. below its melting point or cycled for a period of ten hours to above and below its melting point while simultaneously being subjected to a magnetic field intensity of $10^5$ Oe.

The temperature of the un-textured material may also be cycled above and below its melting point for 1 second or greater intervals in order to increase the diffusion speed. This cycling process may be repeated a single time or a plurality of times. Additionally, the amount of time the material is maintained at or below its melting point may also be varied. Likewise, the range of temperatures the material is allowed to cycle between may also be controlled in order to facilitate diffusion and crystal growth.

In another embodiment the material may also be allowed to cool to within 100° K. above or below the material's melting point after each heating cycle above the material's melting point. Additionally, in another preferred embodiment the material is maintained at a temperature within 100° K. above or below its melting point for at least 1 minute.

In yet another embodiment a partially textured material may be heated to a temperature exceeding its melting point between 1 and 1000 times. In a further embodiment a partially textured material may also be allowed to cool to within 100° K. above or below the material's melting point. Additionally, in another preferred embodiment the material is maintained at a temperature within 100° K. above or below its melting point for at least 1 minute.

The crucible 30 containing the material may be removed from the apparatus 10 and allowed to cool. Once cooled the material may be removed from the crucible 30 and further processed for utilization in electronic, mechanical, or optical components.

Figure 4:
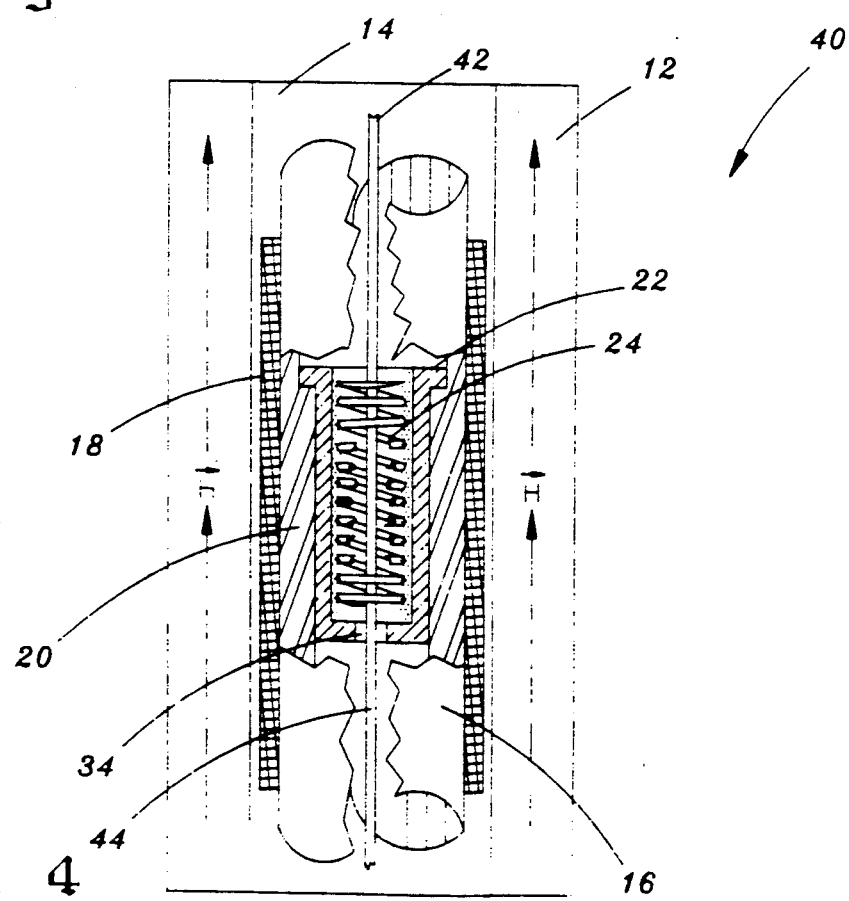
FIG. 4 is a side partial cross-section view of an apparatus for the production of textured wire or tape materials in accordance with the present invention.

FIG. 4 diagrammatically illustrates an apparatus 40 for preparing wires 42 with high texture having anisotropy in the paramagnetic susceptibility. In a preferred embodiment an un-textured polycrystalline material such as $EuBa_2Cu_3O_x$ may be preheated to a temperature approximating the material's melting point.

The un-textured strand 44 drawn from a melt of the material (not shown) may be drawn through the apparatus 40, such as described before, in order to produce textured wire 42 from materials having anisotropy in the paramagnetic susceptibility. Since for this material ($EuBa_2Cu_3O_x$) $\Delta\chi$ is negative, the Cu-O layers will be aligned within the axis of the wire, enhancing the $J_c$.

The bulk and elongated materials produced pursuant to this process are expected to be highly textured and have $J_c$'s above 10 A/cm$^2$ at 77° K.

Figure 5:
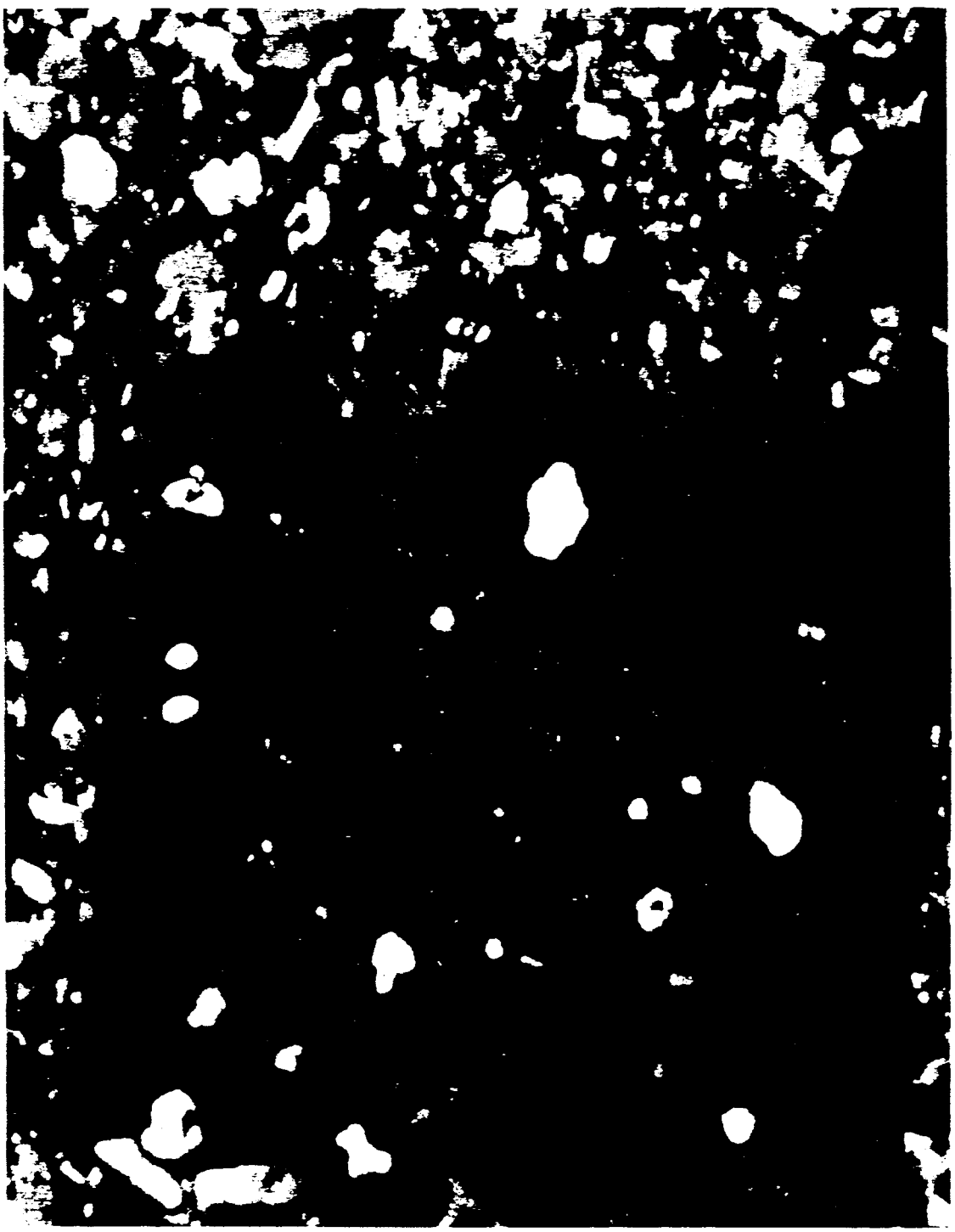
FIG. 5 is a microphotograph of a $HoBa_2Cu_3O_x$ sample with 10 percent low melting temperature eutectic phase addition having a surface orientation perpendicular to a magnetic field of $1.6 \times 10^4$ Oe Crystals of about 250 $\mu$m linear size were formed with an orientation favorable with respect to the direction of the magnetic field.
Figure 6:
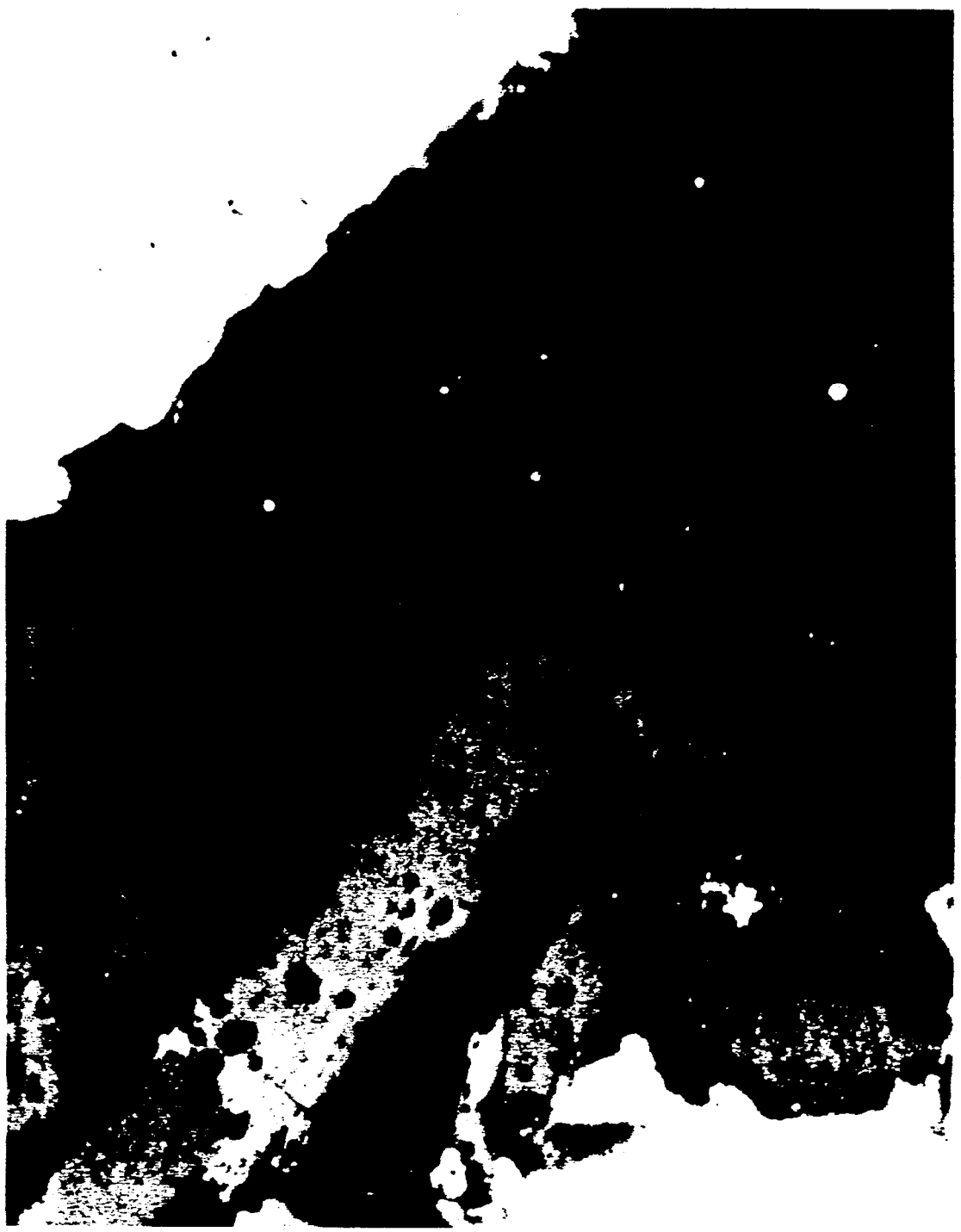
FIG. 6 is a microphotograph taken of a side cross-section of a $HoBa_2Cu_3O_x$ sample with 10 percent low melting temperature eutectic phase addition having a surface orientation perpendicular to a magnetic field of $1.6 \times 10^4$ Oe. Crystals of about 250 $\mu$m linear size were formed with an orientation favorable with respect to the direction of the magnetic field.

FIG. 5 is a microphotograph of a $HoBa_2Cu_3O_x$ sample with 10 percent low melting temperature eutectic phase addition having a surface orientation perpendicular to a magnetic field of $1.6 \times 10^4$ Oe. Crystals of about 250 μm linear size were formed with an orientation favorable with respect to the direction of the magnetic field. Likewise, FIG. 6 is a microphotograph taken of a side cross-section of a $HoBa_2Cu_3O_x$ sample with 10 percent low melting temperature eutectic phase addition having a surface orientation perpendicular to a magnetic field of $1.6 \times 10^4$ Oe. Crystals of about 250 μm linear size were formed with an orientation favorable with respect to the direction of the magnetic field. FIGS. 5 and 6 demonstrate, according to the instant process, that large crystals may be grown where sufficient room for expansion exists.

Whereas, the invention has been described in connection with preferred embodiments thereof, it is apparent that many additions, modifications, and substitutions may be made which are within the intended broad scope of the appended claims. For example, high pressures could be imparted on the ceramic materials before or during the disclosed process. Additionally, highly textured bulk materials might be molded during the disclosed process to form transducers and related electronic components. Also, it is expected that both high strength materials and thermally anisotropic materials may be produced by the process and apparatus of the invention.

Other apparent areas where the present invention may find application include but are not limited by: (1) superconducting cables to carry electric current; (2) ceramic fibers in both integrated and semi-integrated technologies; (3) magnetic storage devices; (4) components in s/c motors; (5) levitating train technology; (6) high strength and other specialized materials; (7) thermal insulating materials; and (8) transducers requiring materials with different mechanical, magnetic, electroconductive, thermo-conductive, and optical properties.

Thus, there has been shown and described a process for producing textured crystalline materials from ceramics with anisotropy in the paramagnetic susceptibility.

SPECIFIC EXAMPLES

In a table top experiment samples were prepared in air from $BaCO_3$, $Ho_2O_3$ ($Y_2O_3$), and $CuO$ in stoichiometric proportions according the formula $Ho(Y)Ba_2Cu_3O_{6.5}$. Precursors were dehydrated and ground together in an agate mortar. The ground material was then calcined in an alumina crucible at 920° C./2d with one intermediate grinding. X-ray analysis showed that the calcined material was single phase. The material was reground to a powder after calcination. Orientation effects were monitored using a Rigaku Geigerflex x-ray diffractometer. X-ray diffraction patterns ($CuK\alpha$ radiation) were measured in the $\theta-2\theta$ mode on the flat compressed end surfaces of the pellets. The magnetic properties of the as-pressed samples in the normal and superconducting states were measured using a Quantum Design SQUID magnetometer. The samples (while air exposed) were then maintained at 920° C. in a 0.7 T magnetic field (parallel to the as-pressed alignment) for periods ranging from 12 to 48 hours. X-ray diffraction, rocking curves, magnetic susceptibility, and magnetization data demonstrated that a high degree of texture had been produced perpendicular to the original texture orientation of the cold pressed samples. The reorientation was determined to be $\approx 30\%$.

EXAMPLE 2

In a table top experiment samples were prepared in air from $BaCO_3$, $Ho_2O_3$ ($Y_2O_3$), and $CuO$ in stoichiometric proportions according to the formula $Ho(Y)Ba_2Cu_3O_{6.5}$. Precursors were dehydrated and ground together in an agate mortar. The ground material was then calcined in an alumina crucible at 920° C./2d with one intermediate grinding. X-ray analysis showed that the calcined material was single phase. The material was reground to a powder after calcination. Orientation effects were monitored using a Rigaku Geigerflex x-ray diffractometer. X-ray diffraction patterns ($CuK\alpha$ radiation) were measured in the $\theta-2\theta$ mode on the flat compressed end surfaces of the pellets. The magnetic properties of the as-pressed samples in the normal and superconducting states were measured using a Quantum Design SQUID magnetometer. The samples (while air exposed) were then maintained at 950° C. in parallel spatial relation to a 1.6 T magnetic field for periods ranging from 12 to 48 hours. X-ray diffraction, rocking curves, magnetic susceptibility, and magnetization data demonstrated that a high degree of texture had been produced. The texture was determined to be $\approx 80\%$.

I claim:

1. A process for producing textured materials comprising the steps of:
   providing an un-textured material, other than thin films having a sodium thallium (NaTl) type crystal structure, having anisotropy in at least one of paramagnetic and diamagnetic susceptibility;
   heating said material sufficiently to initiate substantial grain growth;
   subjecting said heated material to a magnetic field of at least $10^4$ Oe.

2. The process as claimed in claim 1, wherein said untextured ceramic is a perovskite type structured material.

3. The process as claimed in claim 2, wherein said untextured ceramic has a 1:2:3 structure.

4. The process as claimed in claim 2, wherein said un-textured ceramic is $RE-Ba_2Cu_3O_x$, wherein RE is a rare earth, and x is between 6 and 7.

5. The process as claimed in claim 4, wherein said un-textured material is $YBa_2Cu_3O_{7-\delta}$.

6. The process as claimed in claim 4, wherein said un-textured ceramic is $HoBa_2Cu_3O_{7-\delta}$.

7. The process as claimed in claim 1, wherein said un-textured ceramic is $Tl(Bi)Ba_2Ca_{n-1}Cu_nO_{2n+3}$ and n is an integer selected from the set 1, 2, 3, and 4.

8. The process as claimed in claim 1, wherein said un-textured ceramic material is heated to within 100° K. of its melting point.

9. The process as claimed in claim 1, wherein the temperature of said un-textured ceramic material is cycled above and below its melting point for 1 second or greater intervals whereby the diffusion speed is increased.

10. The process as claimed in claim 8, wherein said temperature is cycled above the material's melting point for at least 1 second.

11. The process as claimed in claim 9, wherein said material is heated to a temperature exceeding its melting point at least 1 time.

12. The process as claimed in claim 10, wherein said material is allowed to cool to within 100° K. above or below the material's melting point after each heating cycle above the material's melting point.

13. The process as claimed in claim 1, wherein said material is maintained at a temperature within 100° K. above or below its melting point for at least 1 minute.

14. The process as claimed in claim 1, wherein said un-textured ceramic material is exposed to a magnetic field of at least $10^4$ Oe.

15. The process as claimed in claim 14, wherein the material is exposed to said magnetic field for at least 1 minute.

16. A process for producing textured materials comprising the steps of:
   providing a partially textured material, other than thin films having a sodium thallium (NaTl) type crystal structure, having anisotropy in at least one of paramagnetic and diamagnetic susceptibility;

heating said material sufficiently to initiate substantial grain growth;

subjecting said heated material to a magnetic field of at least $10^4$ Oe.

17. The process as claimed in claim 16, wherein said partially textured ceramic is a perovskite.

18. The process as claimed in claim 17, wherein said partially textured ceramic has a 1:2:3 structure.

19. The process as claimed in claim 17, wherein said partially textured ceramic is RE-$Ba_2Cu_3O_x$, wherein RE is a rare earth, and X is between 6 and 7.

20. The process as claimed in claim 19, wherein said partially textured material is $YBa_2Cu_3O_{7-\delta}$.

21. The process as claimed in claim 19, wherein said partially textured ceramic is $HoBa_2Cu_3O_{7-\delta}$.

22. The process as claimed in claim 1, wherein said partially textured ceramic is $Tl(Bi)Ba_2Ca_{n-1}Cu_nO_{2n+3}$ and n is an integer selected from the set 1, 2, 3, and 4.

23. The process as claimed in claim 16, wherein said partially textured ceramic material is heated to within 100° K. of its melting point.

24. The process as claimed in claim 23, wherein the temperature of said partially textured ceramic material is cycled above and below its melting point for short periods whereby the diffusion speed is increased.

25. The process as claimed in claim 24, wherein said temperature is cycled above the material's melting point for at least 1 second.

26. The process as claimed in claim 25, wherein said material is heated to a temperature exceeding its melting point between 1 and 1000 times.

27. The process as claimed in claim 26, wherein said material is allowed to cool to within 100° K. above or below the material's melting point after each heating cycle above the material's melting point.

28. The process as claimed in claim 23, wherein said material maintained at a temperature within 100° K. above or below its melting point for at least 1 minute.

29. The process as claimed in claim 16, wherein said un-textured ceramic material is exposed to a magnetic field of at least $10^4$ Oe.

30. The process as claimed in claim 29, wherein the material is exposed to said magnetic field for at least 1 minute.

31. A process for bulk textured materials comprising the steps of:

providing an un-textured bulk material, having anisotropy in at least one of paramagnetic and diamagnetic susceptibility;

heating said material sufficiently to initiate substantial grain growth;

subjecting said heated material to a magnetic field of at least $10^4$ Oe.

32. A process for producing elongated textured materials comprising the steps of:

providing an un-textured elongated material, having anisotropy in at least one of paramagnetic and diamagnetic susceptibility;

heating said material sufficiently to initiate substantial grain growth;

subjecting said heated material to a magnetic field of at least $10^4$ Oe.

33. A process for producing textured thin film materials comprising the steps of:

providing an un-textured thin film material, other than thin films having a sodium thallium (NaTl) type crystal structure, having anisotropy in at least one of paramagnetic and diamagnetic susceptibility;

heating said material sufficiently to initiate substantial grain growth;

subjecting said heated material to a magnetic field of at least $10^4$ Oe.

* * * * *